United States Patent
Kamihara et al.

(10) Patent No.: US 10,046,849 B2
(45) Date of Patent: *Aug. 14, 2018

(54) FUEL TANK, MAIN WINGS, AIRCRAFT FUSELAGE, AIRCRAFT, AND MOVING BODY

(71) Applicant: MITSUBISHI HEAVY INDUSTRIES, LTD., Tokyo (JP)

(72) Inventors: Nobuyuki Kamihara, Tokyo (JP); Kazuaki Kishimoto, Tokyo (JP); Toshio Abe, Tokyo (JP); Yuichiro Kamino, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/779,465

(22) PCT Filed: Feb. 18, 2014

(86) PCT No.: PCT/JP2014/053693
§ 371 (c)(1),
(2) Date: Sep. 23, 2015

(87) PCT Pub. No.: WO2014/156369
PCT Pub. Date: Oct. 2, 2014

(65) Prior Publication Data
US 2016/0031545 A1 Feb. 4, 2016

(30) Foreign Application Priority Data
Mar. 26, 2013 (JP) .................... 2013-064443

(51) Int. Cl.
*B64D 37/02* (2006.01)
*B64C 3/34* (2006.01)
(Continued)

(52) U.S. Cl.
CPC ............ *B64C 3/34* (2013.01); *B32B 5/00* (2013.01); *B32B 7/02* (2013.01); *B64D 37/06* (2013.01);
(Continued)

(58) Field of Classification Search
CPC .... B64C 3/34; B64C 3/20; B64C 1/12; B64D 45/02; B64D 37/06; B32B 5/00; B32B 5/02; B29C 70/882; B29C 70/885
See application file for complete search history.

(56) References Cited

U.S. PATENT DOCUMENTS 4,169,816 A    10/1979   Tsien
4,291,816 A *   9/1981   Lamoureux ............ B64C 3/34
                                                                                       220/243
(Continued)

FOREIGN PATENT DOCUMENTS

CN       1950200 A    4/2007
CN     101466598 A    6/2009
(Continued)

OTHER PUBLICATIONS

Europe Patent Office, "Search Report for European Patent Application No. 14774804.0," dated Aug. 30, 2016.
(Continued)

*Primary Examiner* — Assres H Woldemaryam
(74) *Attorney, Agent, or Firm* — Manabu Kanesaka; Benjamin Hauptman; Kenneth Berner (57) ABSTRACT

The purpose of the present invention is to provide a fuel tank, main wings, an aircraft fuselage, an aircraft, and a moving body, which enable working hours and costs involved in a manufacturing process to be reduced, and weight increases to be prevented. The fuel tank includes a structural member in which carbon fiber reinforced plastic (CFRP) is used, the carbon fiber reinforced plastic (CFRP)

(Continued)

including a reinforcing material that includes carbon fibers and a matrix that includes plastic. The structural member is formed by laminating a conductive sheet between prepregs of the carbon fiber reinforced plastic (CFRP). In this case, a cut surface of the structural member formed by cutting the structural member may be exposed on the inside in which fuel is stored.

7 Claims, 7 Drawing Sheets

(51) Int. Cl.
| | | |
|---|---|---|
| *B32B 5/00* | (2006.01) | |
| *B32B 7/02* | (2006.01) | |
| *B64D 45/02* | (2006.01) | |
| *B64D 37/06* | (2006.01) | |
| *H01M 8/04082* | (2016.01) | |

(52) U.S. Cl.
CPC .......... *B64D 45/02* (2013.01); *B32B 2439/00* (2013.01); *H01M 8/04208* (2013.01); *Y02P 70/56* (2015.11); *Y02T 50/44* (2013.01)

(56) References Cited

U.S. PATENT DOCUMENTS

| | | | | |
|---|---|---|---|---|
| 4,352,142 A * | 9/1982 | Olson | ................ | H05F 3/00 |
| | | | | 361/117 |
| 4,556,439 A * | 12/1985 | Bannink, Jr. | ......... | B29C 65/601 |
| | | | | 156/152 |
| 4,556,591 A * | 12/1985 | Bannink, Jr. | ......... | B29C 65/601 |
| | | | | 244/1 A |
| 4,556,592 A * | 12/1985 | Bannink, Jr. | ......... | B29C 65/601 |
| | | | | 403/2 |
| 4,755,904 A * | 7/1988 | Brick | ................ | B64D 45/02 |
| | | | | 244/1 A |
| 5,332,178 A * | 7/1994 | Williams | ............... | B29C 70/446 |
| | | | | 244/117 R |
| 5,855,272 A | 1/1999 | Symons et al. | | |
| 5,866,272 A | 2/1999 | Westre et al. | | |
| 6,086,975 A | 7/2000 | Brick et al. | | |
| 6,114,050 A * | 9/2000 | Westre | ................ | B32B 3/12 |
| | | | | 244/119 |
| 6,320,118 B1 | 11/2001 | Pridham et al. | | |
| 6,327,132 B1 | 12/2001 | Andrivet et al. | | |
| 7,900,412 B2 * | 3/2011 | West | ................ | B64D 37/06 |
| | | | | 52/394 |
| 2005/0175813 A1 | 8/2005 | Wingert | ................ | B32B 15/14 |
| | | | | 428/113 |
| 2005/0271859 A1 | 12/2005 | Tuss et al. | | |
| 2008/0012681 A1 | 1/2008 | Kadar et al. | | |
| 2008/0128430 A1 | 6/2008 | Kovach et al. | | |
| 2008/0137259 A1 * | 6/2008 | Heeter | ................ | B64D 37/32 |
| | | | | 361/218 |
| 2008/0295955 A1 | 12/2008 | Cawse et al. | | |
| 2008/0297967 A1 * | 12/2008 | Winter | ................ | B64D 37/32 |
| | | | | 361/117 |
| 2009/0001217 A1 * | 1/2009 | Dufresne | ................ | B64D 45/02 |
| | | | | 244/119 |
| 2009/0224102 A1 | 9/2009 | White | | |
| 2009/0227162 A1 | 9/2009 | Kruckenberg et al. | | |
| 2010/0020461 A1 | 1/2010 | Heeter et al. | | |
| 2010/0061031 A1 * | 3/2010 | Lopez-Reina Torrijos | ................ | |
| | | | | B29C 70/885 |
| | | | | 361/218 |
| 2010/0107513 A1 * | 5/2010 | Buchanan | ................ | B64C 3/18 |
| | | | | 52/84 |
| 2010/0132875 A1 * | 6/2010 | Ackerman | ............... | B29C 73/10 |
| | | | | 156/98 |
| 2010/0178487 A1 | 7/2010 | Arai et al. | | |
| 2010/0219287 A1 | 9/2010 | Sanchez-Brunete Lvarez et al. | | |
| 2010/0224724 A1 | 9/2010 | Kamino et al. | | |
| 2010/0264274 A1 * | 10/2010 | Bradley | ................ | B32B 3/26 |
| | | | | 244/135 R |
| 2011/0003163 A1 * | 1/2011 | Wood | ................ | B29C 43/203 |
| | | | | 428/525 |
| 2011/0008587 A1 * | 1/2011 | Ruskin | ................ | B29C 66/474 |
| | | | | 428/192 |
| 2011/0147674 A1 | 6/2011 | Arai et al. | | |
| 2011/0151235 A1 | 6/2011 | Arai et al. | | |
| 2011/0255205 A1 | 10/2011 | Lopez-Reina Torrijos et al. | | |
| 2011/0284694 A1 | 11/2011 | Yamaguchi et al. | | |
| 2011/0287246 A1 | 11/2011 | Arai et al. | | |
| 2011/0291056 A1 | 12/2011 | Arai et al. | | |
| 2011/0297315 A1 | 12/2011 | Kishida et al. | | |
| 2011/0297790 A1 | 12/2011 | Yamaguchi et al. | | |
| 2012/0012710 A1 * | 1/2012 | Yamaguchi | ............ | B64D 37/32 |
| | | | | 244/135 R |
| 2012/0058297 A1 | 3/2012 | Arai et al. | | |
| 2012/0138609 A1 | 6/2012 | Gerken et al. | | |
| 2012/0184185 A1 | 7/2012 | Kanazawa et al. | | |
| 2012/0236457 A1 * | 9/2012 | Yamakoshi | ............ | B64D 45/02 |
| | | | | 361/218 |
| 2012/0258323 A1 | 10/2012 | Brown | | |
| 2013/0043351 A1 * | 2/2013 | Kamihara | ................ | F16B 37/14 |
| | | | | 244/132 |
| 2013/0099058 A1 * | 4/2013 | Payne | ................... | B29C 70/086 |
| | | | | 244/123.1 |
| 2013/0319750 A1 * | 12/2013 | Waku | ................... | B29C 70/882 |
| | | | | 174/264 |
| 2015/0014308 A1 | 1/2015 | Kovach et al. | | |
| 2016/0229552 A1 | 8/2016 | Gross et al. | | |

FOREIGN PATENT DOCUMENTS

| | | |
|---|---|---|
| CN | 101501114 A | 8/2009 |
| CN | 101588919 A | 11/2009 |
| CN | 101984009 A | 3/2011 |
| CN | 102361791 A | 2/2012 |
| CN | 102365216 A | 2/2012 |
| CN | 102395465 A | 3/2012 |
| CN | 102883949 A | 1/2013 |
| EP | 0248122 A2 | 12/1987 |
| EP | 0783960 A2 | 7/1997 |
| EP | 1413514 A1 | 4/2004 |
| EP | 2053078 A1 | 4/2009 |
| EP | 2354003 A1 | 8/2011 |
| EP | 2415693 A1 | 2/2012 |
| EP | 2511174 A2 | 10/2012 |
| JP | H02-063725 A | 3/1990 |
| JP | H06-016846 A | 1/1994 |
| JP | H07-096579 A | 4/1995 |
| JP | H09-193296 A | 7/1997 |
| JP | H11-138669 | 5/1999 |
| JP | 2001-510422 A | 7/2001 |
| JP | 2001-304492 A | 10/2001 |
| JP | 2003-154591 A | 5/2003 |
| JP | 2006-265751 A | 10/2006 |
| JP | 2007-521995 A | 8/2007 |
| JP | 2007-301838 A | 11/2007 |
| JP | 2009-138199 A | 6/2009 |
| JP | 2010-508416 A | 3/2010 |
| JP | 2010-132286 A | 6/2010 |
| JP | 2010-194749 A | 9/2010 |
| JP | 2010-234900 A | 10/2010 |
| JP | 2010-235133 A | 10/2010 |
| JP | 2010-280904 A | 12/2010 |
| JP | 2011-084138 A | 4/2011 |
| JP | 2011-168792 A | 9/2011 |
| RU | 2192991 C2 | 11/2002 |
| RU | 2217320 C1 | 11/2003 |
| RU | 2236635 C2 | 9/2004 |
| RU | 2381242 C2 | 2/2010 |
| RU | 2436688 C1 | 12/2011 |
| RU | 2448875 C2 | 4/2012 |
| SU | 1362681 A1 | 12/1987 |
| WO | 99/051494 A1 | 10/1999 |
| WO | 2006/069996 A1 | 7/2006 |

(56) References Cited

FOREIGN PATENT DOCUMENTS

| WO | 2011/050040 A1 | 4/2011 |
| WO | 2012/074639 A1 | 6/2012 |
| WO | 2012/111704 A1 | 8/2012 |

OTHER PUBLICATIONS

PCT, "International Search Report for International Application No. PCT/JP2014/053693".

PCT, "Written Opinion of the International Searching Authority for International Application No. PCT/JP2014/053693".

China Patent Office, "Office Action for Chinese Patent Application No. 201480018314.2," dated Apr. 27, 2016.

Japan Patent Office, "Decision to Grant a Patent for Japanese Patent Application No. 2013-064443," dated Dec. 6, 2016.

PCT/ISA/210, "International Search Report for International Application No. PCT/JP2013/077434," dated Jan. 7, 2014.

PCT/ISA/210, "International Search Report for International Application No. PCT/JP2013/057348," dated May 28, 2013.

Japan Patent Office, "Office Action for Japanese Patent Application No. 2014-507684," dated May 12, 2015.

Japan Patent Office, "Office Action for Japanese Patent Application No. 2014-507684," dated Dec. 15, 2015.

Korea Patent Office, "Office Action for Korean Patent Application No. 10-2014-7023846," dated Oct. 22, 2015.

China Patent Office, "Office Action for Chinese Patent Application No. 201380014810.6," dated Jul. 2, 2015.

China Patent Office, "Office Action for Chinese Patent Application No. 201380048718.1," dated Aug. 22, 2016.

China Patent Office, "Office Action for Chinese Patent Application No. 201480018287.9," dated May 27, 2016.

Russia Patent Office, "Office Action for Russian Patent Application No. 2014133705," dated Nov. 24, 2015.

Russia Patent Office, "Office Action for Russian Patent Application No. 2015109128," dated Aug. 4, 2016.

Russia Patent Office, "Office Action for Russian Patent Application No. 2015140425," dated Jun. 16, 2017.

Europe Patent Office, "Search Report for European Patent Application No. 13769070.7," dated Nov. 2, 2015.

Russia Patent Office, "Office Action for Russian Patent Application No. 2015140423," dated Jan. 20, 2017.

\* cited by examiner

FUEL TANK, MAIN WINGS, AIRCRAFT FUSELAGE, AIRCRAFT, AND MOVING BODY

RELATED APPLICATIONS

The present application is National Phase of International Application No. PCT/JP2014/053693 filed Feb. 18, 2014, and claims priority from Japanese Application No. 2013-064443, filed Mar. 26, 2013, the disclosure of which is hereby incorporated by reference herein in its entirety.

TECHNICAL FIELD

The present invention pertains to a fuel tank, main wings, an aircraft fuselage, an aircraft, and a moving body in which carbon fiber reinforced plastic is used as a structural member.

A main wing of an aircraft may be used as a fuel tank capable of storing fuel. A fuel tank that forms an integral part of the main wing, the wing structure having a liquid-tight structure that prevents fuel leakage, is referred to as an integral tank. Composite materials such as carbon fiber reinforced plastic (hereinafter, CFRP) tend to be used for integral tanks with the goal of reducing weight. In CFRP, carbon fiber is used as a reinforcing material, and a synthetic resin is used as a matrix.

Patent Document 1 discloses an invention of a three-dimensional fiber-reinforced resin composite material in which selvage threads are formed from an electrically conductive material having a higher level of electrical conductivity than in-plane directional threads in order to impart the fiber-reinforced resin composite material with electrical conductivity without reducing productivity. Also, Patent Document 2 discloses an invention of a prepreg and a carbon-fiber-reinforced composite material in which electrically conductive particles or fibers are included in order to provide both superior impact resistance and electrical conductivity. Furthermore, Patent Document 3 discloses an invention of an improved composite material that contains electrically conductive particles dispersed within a polymer resin in order to impart electrical conductivity while substantially or entirely avoiding increased weight over a standard composite material.

CITATION LIST

Patent Literature

Patent Document 1: Japanese Unexamined Patent Application Publication No. 2007-301838A
Patent Document 2: Japanese Unexamined Patent Application Publication No. 2010-280904A
Patent Document 3: Japanese Unexamined Patent Application Publication No. 2011-168792A

SUMMARY OF INVENTION

Technical Problem

As it happens, in a situation where CFRP is used in a fuel tank for an aircraft, ends of carbon fibers are exposed in the interior of the fuel tank at a front surface of the CFRP components, particularly at a cut surface formed by a cutting process.

In such a situation, there is a risk of sparks being generated between the carbon fibers at the ends of the carbon fibers upon lightning strike on the main wing, as a lightning current flows through the front surface or through the cut surface of the CFRP components. As a countermeasure against such sparks, a sealant or the like is applied to the front surface or to the cut surface of the CFRP components, which is a method of sealing the generated sparks within the interior. However, given that a certain thickness must be ensured for the applied sealant, the work of applying the sealant increases the working hours and costs of the manufacturing process for the fuel tank. In addition, the thickly applied sealant increases the weight of the main wing.

In addition, given that the thickness of the sealant is directly connected to the capacity for sealing the generated sparks, quality management requirements regarding the sealant thickness upon application become strict. Accordingly, the hours and costs relating to quality management also increase.

Here, the above-described problems are not limited to an integral tank that is integrated with the main wing of an aircraft, but also occur in a vessel for a fuel cell through which fuel flows. In the following, a vessel for a fuel cell is included in the description of the fuel tank. In addition, a similar problem occurs in a fuselage of an aircraft having a fuel tank, and in a moving body other than an aircraft, such as an automobile in which a fuel tank is mounted.

The present invention has been made in consideration of these circumstances, and an object thereof is to provide a fuel tank, main wings, an aircraft fuselage, an aircraft, and a moving body, which enable working hours and costs involved in a manufacturing process to be reduced, and weight increases to be prevented.

Solution to Problem

In order to solve the above-described problems, the fuel tank, the main wings, the aircraft fuselage, the aircraft, and the moving body of the present invention employ the following arrangement.

That is, a fuel tank according to a first aspect of the present invention comprises a structural member in which carbon fiber reinforced plastic is used, the carbon fiber reinforced plastic comprising a reinforcing material that includes carbon fiber and a matrix that includes plastic. The structural member is formed by laminating a conductive sheet between prepregs of the carbon fiber reinforced plastic.

According to this configuration, the structural member of the fuel tank uses carbon fiber reinforced plastic. At manufacturing time, the structural member is formed upon laminating a conductive sheet between prepregs of the carbon fiber reinforced plastic. As a result, the structure has higher conductivity in comparison to carbon fiber reinforced plastic that is not laminated with the conductive sheet. In a situation where conductivity is not imparted and a process of applying sealant or the like to an end of the structural member is not performed, then upon lightning strike, there is a risk that a lightning current flowing in the end may generate sparks between the reinforcing materials at the end. However, the structural member of the present invention is imparted with conductivity by laminating with the conductive sheet, such that conduction is secured at the interior of the structural member, which enables the generation of sparks at the end of the structural member to be prevented.

In the above-described first aspect, a cut surface of the structural member, formed by cutting the structural member, may be exposed at an interior in which fuel is stored.

According to this configuration, the end of the structural member is a cut surface. This cut surface has conductivity ensured for the structural member, despite being exposed to the interior in which fuel is stored. As such, conduction is ensured at the interior of the structural member, which enables the generation of sparks at the end of the structural member to be prevented.

In the above-described first aspect, the reinforcing material or the matrix may be imparted with conductivity. Accordingly, further conductivity is secured in the structural member.

In addition, a main wing according to a second aspect of the present invention comprises the above-described fuel tank as a structural body. Also, an aircraft fuselage according to a third aspect of the present invention comprises the above-described fuel tank. An aircraft according to a fourth aspect of the present invention comprises the above-described main wing or aircraft fuselage. Furthermore, a moving body according to a fifth aspect of the present invention comprises the above-described fuel tank.

According to these configurations, the structural member of the fuel tank has conductivity ensured. As such, conduction is ensured at the interior of the structural member, which enables the generation of sparks at the end of the structural member to be prevented.

Advantageous Effects of Invention

According to the present invention, conductivity is imparted to the structural member that is laminated with the conductive sheet. As such, conduction is ensured at the interior of the structural member, which enables the generation of sparks between the reinforcing materials at the end of the structural member to be prevented. Also, there is no need to separately apply a sealant or the like to the end of the structural member, which enables working hours and costs involved in a manufacturing process to be reduced, and weight increases to be prevented.

DESCRIPTION OF EMBODIMENTS

An embodiment of the present invention is described below with reference to the accompanying drawings.

First, the configuration of a main wing 1 of an aircraft is described according to the present embodiment.

Figure 1:
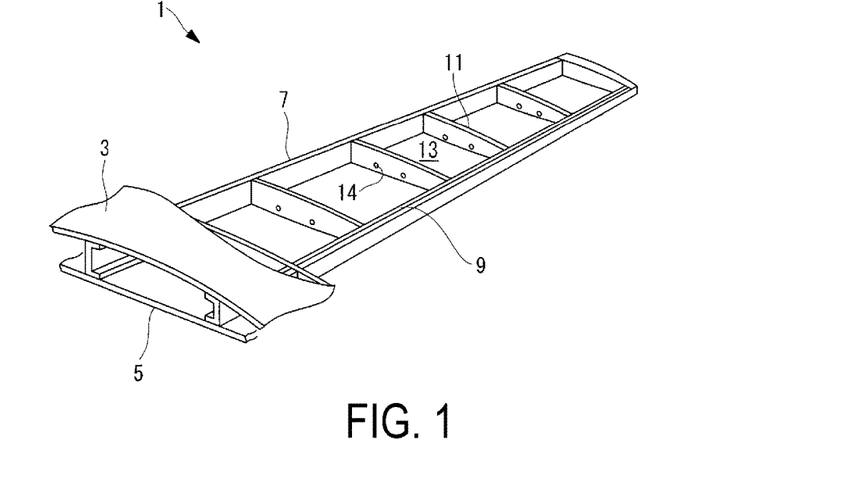
FIG. 1 is a partial cutaway perspective view illustrating a main wing according to an embodiment of the present invention.
Figure 2:
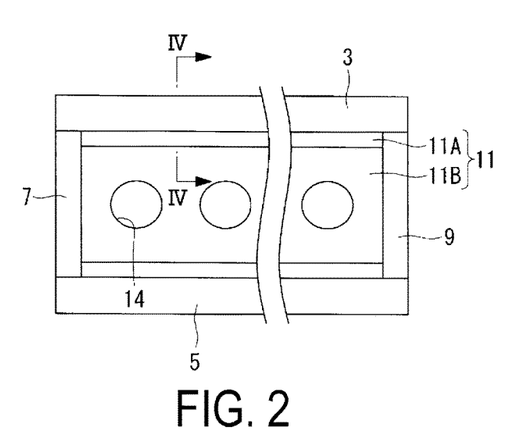
FIG. 2 is a longitudinal cross-sectional view illustrating the main wing according to the embodiment of the present invention.

As illustrated in FIGS. 1 and 2, the main wing 1 includes an upper skin 3, a lower skin 5, a forward spar 7, a rear spar 9, a plurality of ribs 11, and the like.

The upper skin 3 and the lower skin 5 constitute the exterior of the main wing 1, and are thin plates also acting as aerodynamic surfaces. The upper skin 3 and the lower skin 5, along with the forward spar 7, the rear spar 9, and stringers (not illustrated) partially bear tensile loads and compressive loads acting on the main wing 1.

As illustrated in FIG. 1, the forward spar 7 and the rear spar 9 are structural members that extend in a lengthwise direction of the main wing 1, and are disposed between the upper skin 3 and the lower skin 5. A plurality of stringers are auxiliary members that extend in the lengthwise direction of the main wing 1 on the inner surface of the upper skin 3 or of the lower skin 5, and are disposed between the forward spar 7 and the rear spar 9.

As illustrated in FIG. 1, the ribs 11 are structural members provided in the widthwise direction of the main wing 1, and are disposed between the upper skin 3 and the lower skin 5. Specifically, the ribs 11 are structural members extending in a direction roughly orthogonal to the forward spar 7 and the rear spar 9, and are plate-like members formed in the shape of the longitudinal cross-section of the main wing 1. As illustrated in FIGS. 1 and 2, a plurality of openings 14 are formed in the ribs 11 in the longitudinal direction.

In the main wing 1, a section surrounded by the forward spar 7, the rear spar 9, the upper skin 3, and the lower skin 5 is used as a fuel tank 13 in which fuel is stored. The fuel tank 13 is what is known as an integral tank, in which the structure of the aircraft itself is used as a vessel. The forward spar 7, the rear spar 9, the upper skin 3, the lower skin 5, and the ribs 11 are also structural members of the fuel tank 13. The fuel tank 13 has a liquid-tight structure that prevents fuel from leaking to the exterior.

A fuel pipe (not illustrated) for supplying the fuel to the fuel tank 13, a plurality of fuel gauges (not illustrated) for detecting a fuel level, wiring (not illustrated) for the fuel gauges, and the like are disposed within the fuel tank 13.

Next, the structural members of the fuel tank 13 are described.

Figure 3:
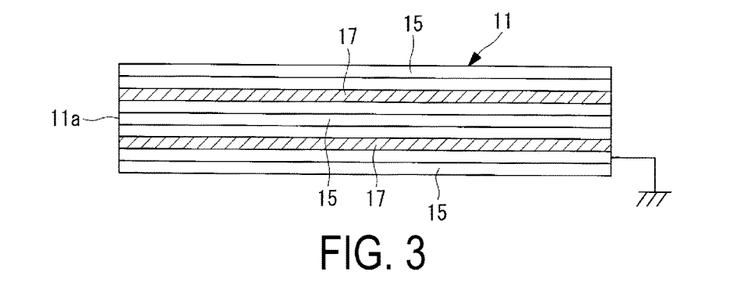
FIG. 3 is an end view illustrating a flange of a rib according to the embodiment of the present invention with respect to arrows III-III of FIG. 5.

Carbon fiber reinforced plastic (hereinafter, CFRP) is used for the structural members of the fuel tank 13, specifically, for the forward spar 7, the rear spar 9, the upper skin 3, the lower skin 5, and the ribs 11. Also, the structural members of the present embodiment applied to the fuel tank 13 are formed by laminating a conductive sheet 17 between prepregs of the CFRP 15 during the manufacturing process. Accordingly, as illustrated in FIG. 3, the structural members each have a laminate structure formed by the CFRP 15 and the conductive sheet 17.

The CFRP 15 is formed from a reinforcing material that includes carbon fiber, a matrix that includes plastic, and the like. Here, the matrix may be imparted with electrical conductivity, or may not be imparted with electrical conductivity. In a case where the matrix is imparted with electrical conductivity, the CFRP 15 itself is also electrically conductive.

The matrix includes a plastic such as a thermosetting resin, for example an unsaturated polyester or epoxy resin. Various techniques of imparting electrical conductivity to a plastic such as a thermosetting resin or the like may be applied as the method of imparting the matrix with electrical conductivity, detailed description of which is omitted from the present specification. Methods of imparting the matrix with electrical conductivity may be, for example, including electrically conductive particles or fibers in the plastic, or imparting the plastic itself with electrical conductivity.

The conductive sheet 17 is shaped as sheet, and is a member having low electrical resistance. The conductive sheet 17 may be metallic, or may be non-metallic. A metallic conductive sheet 17 is, for example, made from copper, titanium, or the like, and may be shaped as a uniform sheet having no openings, may be shaped as a punched metal sheet having openings, or may be shaped as a mesh or the like. A non-metallic conductive sheet 17 is, for example, made from carbon fiber or the like, and includes non-woven fabric and portions formed of flat-woven fabric such as gauze and the like. Also, carbon nanotube may be used as the carbon fiber.

Here, using a metal in the conductive sheet 17 that forms a battery upon contact with the carbon of the CFRP 15, such as nickel or aluminum, is not desirable.

The conductive sheet 17 is connected to a spark location provided at the exterior of the structural members, that is, to a location where a lightning current ultimately flows.

Here, FIG. 3 illustrates one of the ribs 11. However, a similar configuration also applies to other members. In the fuel tank 13, the forward spar 7, the rear spar 9, the upper skin 3, the lower skin 5, and the ribs 11 may not be formed entirely from the structural members including the CFRP 15, and may be partially formed of a metal such as an aluminum alloy.

Figure 4:
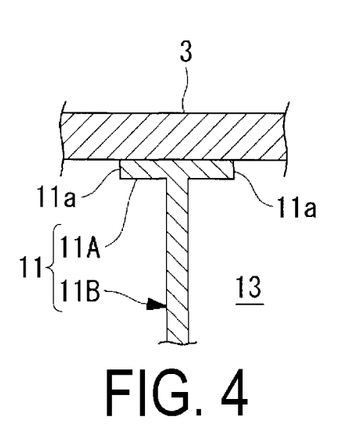
FIG. 4 is a partial longitudinal cross-sectional view illustrating an upper skin and the rib according to the embodiment of the present invention, sectioned along line IV-IV of FIG. 2.

The structural members of the CFRP 15 and the conductive sheet 17 in the fuel tank 13 have a cut surface, formed by a cutting process, that is exposed at the interior of the fuel tank 13 storing the fuel. For example, as illustrated in FIG. 4, in a situation in which each of the ribs 11 is formed from a flange 11A, a web 11B, and the like, a cut surface 11a is exposed at an end of the flange 11A at the interior of the fuel tank 13.

Figure 5:
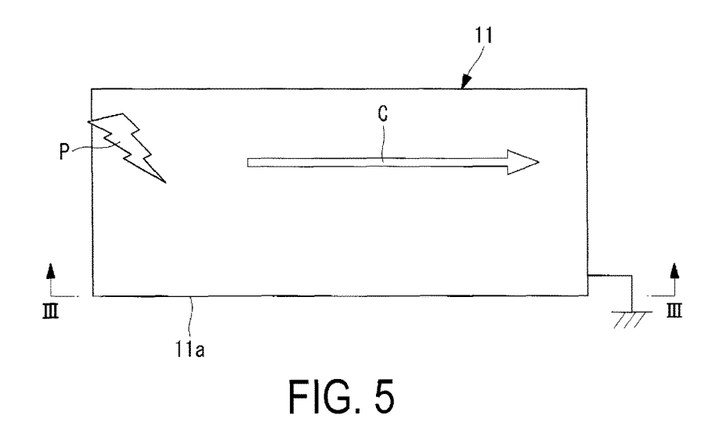
FIG. 5 is a top view illustrating the flange of the rib according to the embodiment of the present invention.

In the present embodiment, the conductive sheet 17 having high electrical conductivity is inserted into the structural members including the CFRP 15, such that as illustrated in FIG. 5, upon a lightning strike on the ribs 11 of the main wing 1, a lightning current C also flows through the conductive sheet 17 in the structural members while the lightning current C is flowing from a strike point P through the structural members. As a result, sparks are unlikely to be generated at the cut surface 11a of the structural members due to the reduction in the lighting current C flowing into the CFRP 15.

Figure 6:
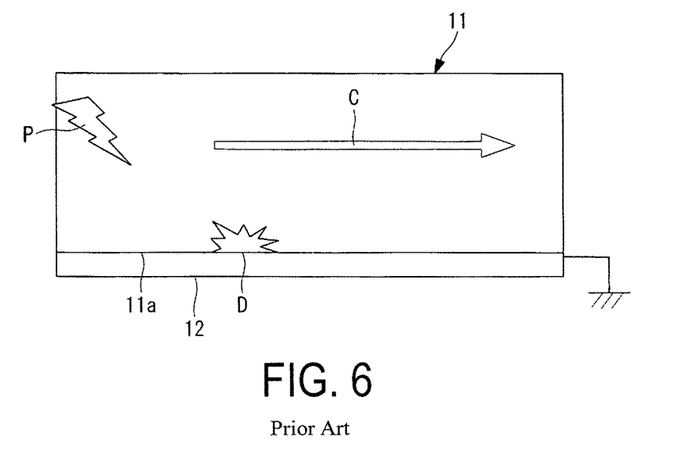
FIG. 6 is a top view illustrating a flange of a conventional rib.

In a situation where, unlike the present embodiment, the conductive sheet 17 is not inserted into the structural members, then, as illustrated in FIG. 6, upon lightning strike on the ribs 11 of the main wing 1, there is a risk that a spark D (see FIG. 6) may be generated between the reinforcing material at the ends of the reinforcing material while the lightning current C is flowing from the strike point P through a front surface or the cut surface 11a of the CFRP components. Conventionally, a countermeasure against such sparks is to apply a sealant 12 or the like onto the front surface or the cut surface 11a of the CFRP components as illustrated by FIG. 6, which serves to seal the generated current within the interior. However, the work of applying the sealant 12 leads to an increase in working hours and costs of the manufacturing process of the fuel tank 13. In addition, the applied sealant 12 leads to an increase in weight of the main wing 1.

In contrast, according to the present embodiment, the conductive sheet 17 having high electrical conductivity is inserted into the structural members that include the CFRP 15, such that despite the cut surface 11a being exposed at the interior of the fuel tank 13, the generation of sparks is prevented at the cut surface 11a of the structural members. As a result, there is no need for application of sealant to the front surface or the cut surface 11a of the structural members, which enables the sealant application method to be simplified and the like. Accordingly, this enables a reduction in working hours and costs of the manufacturing process of the fuel tank and of the quality management of the sealant application. In addition, this also enables the weight to be reduced by the corresponding weight of the sealant.

Next, results are described of a lighting resistance test performed by creating a test piece for each of the embodiment of the present invention and a conventional example.

In the present test, a structural member provided with CFRP laminated with the conductive sheet 17 having electrical conductivity (the present embodiment) and CFRP not laminated with the conductive sheet 17 (conventional) are compared in terms of a current value produced when a spark is generated upon application of a large current waveform to the test piece.

The test method for the lightning resistance test conforms to the description of the Conducted Current Test in the SAE International Aircraft Lightning Test Methods (ARP5416). The large current waveform applied to the test piece is a component A waveform of simulated lightning current defined by ARP5412A.

Figure 7:
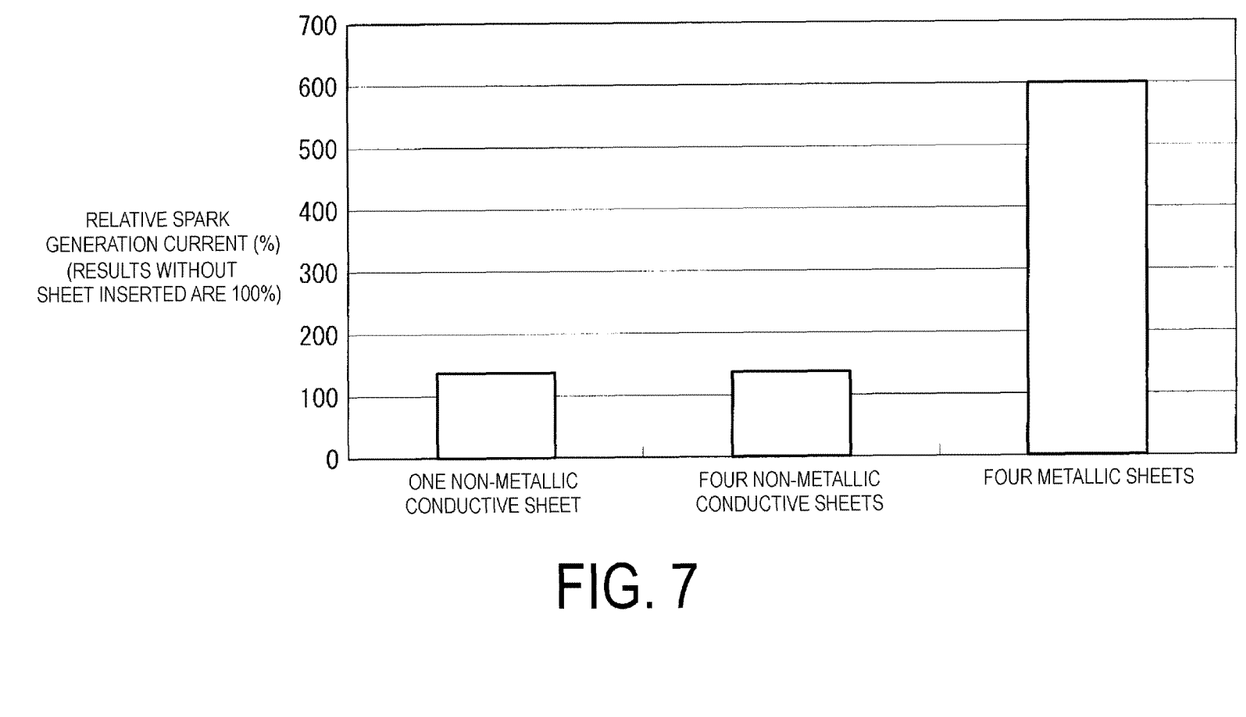
FIG. 7 is a graph showing a relative spark generation current [%] for each test piece.

FIG. 7 shows the relative spark generation current [%] for each of the test pieces. The lightning resistance test was performed on a plurality of test pieces varying in the type of the conductive sheet 17 and the quantity of laminated layers, obtaining results as indicated in FIG. 7. In FIG. 7, the spark generation current value for each of the test pieces is indicated as a percentage, where 100% corresponds to the spark generation current value of the CFRP that is not laminated with the conductive sheet.

As test pieces for the structural member provided with the CFRP that is laminated with the conductive sheet 17, a piece laminated with one layer of the non-metallic conductive sheet 17, a piece laminated with four layers of the non-metallic conductive sheet 17, and a piece laminated with four layers of the metallic conductive sheet 17 were prepared.

According to the test results, it was confirmed that the relative spark generation current is high in cases in which the conductive sheet 17 is non-metallic and cases in which the conductive sheet 17 is metallic, and that the generation of sparks due to lightning current upon lightning strike may be constrained in comparison to the CFRP that is not laminated with the conductive sheet 17.

In cases in which the conductive sheet 17 is non-metallic, it was confirmed that the relative spark generation current has substantially identical values in cases in which the quantity of laminated sheets is one layer and cases in which the quantity is four layers, and that laminating at least one of the conductive sheet 17 with the CFRP enables the generation of sparks due to the lightning current upon lightning strike to be constrained.

Note that, in the above-described embodiment, an arrangement in which the fuel tank 13 is termed an integral tank, being integrated with the main wing of the aircraft, has been described, yet the present invention is not limited to this example. For example, the above is also applicable to a structural member used in a vessel (fuel tank) for a fuel cell through which the fuel flows. In addition, the above is also applicable to a structural member of a fuel tank provided in a fuselage of an aircraft, or to a structural member of a fuel tank mounted in a moving body other than an aircraft, such as an automobile.

REFERENCE SIGNS LIST

1 Main wing
3 Upper skin
5 Lower skin
7 Forward spar
9 Rear spar
11 Rib(s)
11*a* Cut surface
11A Flange
11B Web
12 Sealant
13 Fuel tank
15 CFRP
17 Conductive sheet

The invention claimed is:

1. A fuel tank, comprising a structural member in which carbon-fiber-reinforced plastic is used, the carbon-fiber-reinforced plastic including a reinforcing material that includes carbon fibers and a matrix that includes plastic, the structural member being formed by laminating a conductive sheet between prepregs of the carbon-fiber-reinforced plastic, wherein the structural member is a rib having a flange and a web, and wherein the carbon fibers included in the reinforcing material on a cut surface of the flange at an end thereof, formed by cutting the structural member, are exposed at an interior in which fuel is stored.

2. The fuel tank according to claim 1, wherein one of the reinforcing material and the matrix is imparted with conductivity.

3. A main wing comprising the fuel tank described in claim 1 as a structural body.

4. An aircraft fuselage comprising the fuel tank described in claim 1.

5. An aircraft comprising the main wing described in claim 3.

6. A moving body comprising the fuel tank described in claim 1.

7. An aircraft comprising the aircraft fuselage described in claim 4.

* * * * *